United States Patent
Huttenhuis et al.

(10) Patent No.: US 11,999,026 B2
(45) Date of Patent: Jun. 4, 2024

(54) INSTALLATION AND METHOD FOR PROCESSING OPTICAL LENSES

(71) Applicant: SCHNEIDER GMBH & CO. KG, Fronhausen (DE)

(72) Inventors: Stephan Huttenhuis, Niederweimar (DE); Gunter Schneider, Marburg (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 1322 days.

(21) Appl. No.: 16/487,727

(22) PCT Filed: Feb. 16, 2018

(86) PCT No.: PCT/EP2018/053900
§ 371 (c)(1),
(2) Date: Sep. 10, 2019

(87) PCT Pub. No.: WO2018/153787
PCT Pub. Date: Aug. 30, 2018

(65) Prior Publication Data
US 2019/0389026 A1 Dec. 26, 2019

(30) Foreign Application Priority Data
Feb. 22, 2017 (DE) ................. 10 2017 001 680.1

(51) Int. Cl.
B24B 13/00 (2006.01)
B23Q 7/14 (2006.01)
(Continued)

(52) U.S. Cl.
CPC ........ *B24B 13/0031* (2013.01); *B23Q 7/1426* (2013.01); *B24B 13/005* (2013.01); *B29D 11/00423* (2013.01)

(58) Field of Classification Search
CPC .................................................. B34B 13/0031
See application file for complete search history.

(56) References Cited

U.S. PATENT DOCUMENTS 4,006,563 A 2/1977 Charlot
4,544,318 A 10/1985 Nagatomo et al.
(Continued)

FOREIGN PATENT DOCUMENTS

CN 102226876 A 10/2011
CN 105398068 A 3/2016
(Continued)

OTHER PUBLICATIONS

EP2822883 Schneider (Year: 2017).*
(Continued)

*Primary Examiner* — Gene O Crawford
*Assistant Examiner* — Lester Rushin, III
(74) *Attorney, Agent, or Firm* — Calderon Safran & Wright, P.C.; David S. Safran (57) ABSTRACT

An installation and a method for processing optical lenses, whereby transport carriers and block pieces are conveyed backward after use in each case to a commissioning device or blocking device, and the lens carriers are fitted by machine with unblocked or blocked lenses in order to make possible an automated and optimized process sequence.

20 Claims, 3 Drawing Sheets

(51) Int. Cl.
*B24B 13/005* (2006.01)
*B29D 11/00* (2006.01)

(56) References Cited

U.S. PATENT DOCUMENTS

| | | | |
|---|---|---|---|
| 4,727,684 | A | 3/1988 | Kobayashi et al. |
| 5,024,315 | A | 6/1991 | Ward |
| 5,372,241 | A | 12/1994 | Matsumoto |
| 5,551,348 | A | 9/1996 | Matsumoto |
| 5,555,504 | A | 9/1996 | Lepper et al. |
| 5,744,357 | A | 4/1998 | Wang et al. |
| 5,804,107 | A | 9/1998 | Martin et al. |
| 5,844,802 | A | 12/1998 | Lepper et al. |
| 5,884,746 | A | 3/1999 | Leisner et al. |
| 5,947,259 | A | 9/1999 | Leisner et al. |
| 6,039,899 | A | 3/2000 | Martin et al. |
| 6,071,440 | A | 6/2000 | Wang et al. |
| 6,336,546 | B1 | 1/2002 | Lorenz |
| 6,439,870 | B1 | 8/2002 | Marceau et al. |
| 6,618,692 | B2 | 9/2003 | Takahashi et al. |
| 6,654,663 | B1 | 11/2003 | Jokela |
| 6,716,294 | B1 | 4/2004 | Vetrini |
| 6,738,682 | B1 | 5/2004 | Pasadyn |
| 6,836,692 | B2 | 12/2004 | Leavitt et al. |
| 6,854,583 | B1 | 2/2005 | Horn |
| 7,090,559 | B2 | 8/2006 | Vulich et al. |
| 7,801,641 | B2 | 9/2010 | Yoshikawa et al. |
| 8,241,534 | B2 | 8/2012 | Akiyama |
| 8,397,898 | B2 | 3/2013 | Buchmann et al. |
| 8,616,150 | B2 * | 12/2013 | Savoie ............... B24B 13/005 118/712 |
| 8,784,160 | B2 | 7/2014 | Breme |
| 9,031,682 | B2 | 5/2015 | Tanaka et al. |
| 9,340,669 | B2 | 5/2016 | Schneider et al. |
| 9,840,373 | B2 | 12/2017 | Schneider |
| 9,908,714 | B2 | 3/2018 | Schneider |
| 2002/0035477 | A1 | 3/2002 | Takahashi et al. |
| 2003/0017794 | A1 | 1/2003 | Kozakai et al. |
| 2003/0067889 | A1 | 4/2003 | Petite |
| 2003/0115510 | A1 | 6/2003 | Takayama |
| 2008/0184114 | A1 | 7/2008 | Hano |
| 2009/0228129 | A1 | 9/2009 | Moyne et al. |
| 2011/0166688 | A1 | 7/2011 | Moyne et al. |
| 2012/0209416 | A1 | 8/2012 | Tanaka et al. |
| 2013/0270759 | A1 | 10/2013 | Schneider et al. |
| 2014/0067108 | A1 | 3/2014 | Pedigo et al. |
| 2014/0228995 | A1 | 8/2014 | Tanaka et al. |
| 2015/0105892 | A1 | 4/2015 | Townsend et al. |
| 2015/0314411 | A1 | 11/2015 | Samukawa et al. |
| 2016/0149996 | A1 | 5/2016 | Eckert et al. |
| 2017/0269573 | A1 | 9/2017 | Holzkamper et al. |
| 2018/0318978 | A1 * | 11/2018 | Schneider ........... B24B 27/0023 |

FOREIGN PATENT DOCUMENTS

| | | |
|---|---|---|
| DE | 3614165 A1 | 10/1987 |
| DE | 29823464 U1 | 6/1999 |
| DE | 19815728 A1 | 10/1999 |
| DE | 10353553 A1 | 6/2005 |
| DE | 102004021696 A1 | 11/2005 |
| DE | 102007059303 A1 | 6/2009 |
| EP | 2489469 A1 | 8/2012 |
| GB | 1567587 A | 5/1980 |
| GB | 2344439 A | 6/2000 |
| JP | S60146646 A | 8/1985 |
| WO | 02087861 A2 | 7/2002 |
| WO | 2008042277 A1 | 10/2008 |

OTHER PUBLICATIONS

AU2008297393 Glacet (Year: 2009).*
CN114423593 (Year: 2022).*
Der Augen Optiker: "Technik für neue Ansprüche an Brillengläser", 2003, pp. 50-51.—ISSN 0004-7929 (English-language translation attached).
Schiffhauer, Nils: "Durchbrüche an der Wellenfront", Frankfurter Allgemeine Sonntagszeitung, Apr. 5, 2009, 4 pages, No. 14 (English-language translation attached).
Rexroth Bosch Group: "Transfersystem TS 2plus", Apr. 2011, pp. 0-4, 1-1 to 1-10, 4-1 to 4-25 & 5-1 to 5-40.
Konrad, Beat: "On-block Manufacturing Back side processing advantages", https://www.satisloh.com/fileadmin/contents/Technical-papers/On-Block-Manufacturing_EN.pdf, May 6, 2016, pp. 1-23, XP055471305.
Anonymous: "Modulo Line, Automated lens processing, intelligently combined"; Internet brochure; XP-002766329; Jan. 19, 2017; https://www.schneider-om.com/fileadmin/media/schneider-om/opthalmics/Lines/Brochure-modulo-line.PDF.
Kevin Cross: "Where Is Automation Taking the 21st Century Lab?"; Internet article; XP-002772552; Jul. 25, 2017; https://opticallabproducts.com/where-is-automation-taking-the-21st-century-lab/.
Hao Zhang et al., "Remote service and remote engineering support system of manufacturing enterprises", Tongji University Press, May 2002, pp. 197-199, ISBN 7-5608-2421-8, 1st Edition, Shanghai, China.

* cited by examiner

INSTALLATION AND METHOD FOR PROCESSING OPTICAL LENSES

BACKGROUND OF THE INVENTION

Field of the Invention

The present invention relates to an installation for processing lenses with a blocking device for blocking a lens that is to be processed on a block piece by means of a block material, with multiple processing devices for processing the lenses, a deblocking device for deblocking the processed lenses, and a transport system for conveying the lenses in or on transport carriers, as well as a to method for processing lenses wherein the lenses are processed by processing devices, wherein each lens is blocked on a block piece by means of a block material in a blocking device for processing and is deblocked again in a deblocking device after processing.

Lenses, in particular eyeglass lenses, are usually blocked, i.e., fastened or secured, for processing on a so-called block piece as a holder by means of a so-called block material. The block piece is used to hold the lens that is fastened therein—i.e., blocked—in a very precise and defined way for some or multiple processing steps. The lens is then deblocked, i.e., detached from the block piece. With respect to an economical lens manufacturing, this is to be done efficiently and quickly in a simple way.

As block material, alloys with low melting points and thermoplastics, i.e., thermoplastic materials, or non-thermoplastic materials, in particular hardening adhesives, but also adhesive strips or the like, can be used. Depending on the block material that is used, various requirements or process sequences arise from deblocking, i.e., detaching the lens from the block piece or block material.

Description of Related Art

German Patent Application DE 103 53 553 A1 discloses an installation and a method for deblocking eyeglass lenses, i.e., lenses for eyeglasses, wherein the lenses are guided or conveyed by means of a strip-like conveying system through a tempered water bath for deblocking and then after separation from the block piece continuously in succession through multiple cleaning systems. This installation is relatively large and does not allow for optimal throughput.

International Patent Publication WO 2013/131656 A2 and corresponding U.S. Pat. No. 9,840,373 B2 disclose an installation and a method for processing optical lenses, wherein lenses or transport carriers with lenses are selectively conveyed to independently-operating processing devices, which form a processing line.

SUMMARY OF THE INVENTION

The object of the present invention is to indicate an installation and a method for processing optical lenses, wherein an especially efficient process sequence is made possible.

The present invention relates in particular to a facility and a method with multiple processing devices and/or with at least one processing line for processing optical lenses, especially preferably eyeglass lenses. The facility and/or processing line comprises in particular multiple, in particular (largely) independently-operating processing devices. Especially preferably, the processing line (also) comprises multiple processing devices for the same processing steps, in order, for example, to increase the throughput.

Especially preferably, the lenses are conveyed in or on and/or by means of transport carriers from a blocking device to one and/or more processing devices or processing lines for processing the lenses and finally again to a deblocking device for deblocking the processed lenses. In particular, the installation has a transport system for conveying lenses and/or transport carriers.

According to a first aspect of the present invention, the installation preferably has a commissioning device for fitting the transport carriers with lenses that are to be processed and with assigned block pieces. This makes possible a fully-automated and thus optimized process sequence.

Especially preferably, the transport carriers are designed with or provided with an information carrier, in particular data carrier, barcode, or the like, which contains or makes available necessary information for processing. The information and/or information carriers are especially preferably provided, affixed, examined, updated and/or exchanged by the commissioning device. Especially preferably, the information carriers can be read electronically or optically. The information can also in particular contain or make available processing status, order numbers, instructions regarding the block pieces that are used, and the like.

According to a second, also independently realizable aspect of the present invention, the installation preferably has at least one return-conveying device for return-conveying the deblocked block pieces and/or the transport carriers to the commissioning device. This allows for an automated and optimized process sequence.

If necessary, the deblocked block pieces can also be return-conveyed to the commissioning device in or with the transport carriers.

Alternatively, the return-conveying of the block pieces and transport carriers can be done separately—in particular, thus, with separate return-conveying devices. This is done in particular when the transport carriers are next used—after the deblocking—for the transport of deblocked lenses.

After the deblocking, a further processing of lenses, in particular a cleaning, a coating and/or an edge processing or the like, preferably takes place. The lenses can be conveyed in or on and/or by means of transport carriers from one device to the next for this purpose as well. These transport carriers can correspond to the above-mentioned ones. Alternatively, additional transport carriers according to the additional type can also be used for this purpose, which carriers are made differently, in particular smaller, than the original transport carriers according to the standard type.

Preferably, the installation has a device for cleaning the transport carriers according to the standard type and/or the additional type. In particular, the device is integrated into the deblocking device, the commissioning device or another device, such as an optional storage device for intermediate storage of transport carriers. However, it can also be a separate device.

Preferably, the installation has a device for in particular optical examination of the transport carriers according to the standard type and/or additional type. The device is integrated in particular into the deblocking device, the commissioning device or another device, such as a storage device. However, it can also be a separate device.

Preferably, the installation has a device for in particular optical examination of block pieces. The device is in particular integrated into the deblocking device, the commissioning device and/or another device, such as a storage device, which is used in particular in the intermediate storage of block pieces. However, it can also be a separate device.

Preferably, the installation has a device for sorting the block pieces according to size and/or shape. The device is in particular integrated into the deblocking device, the commissioning device or another device, such as a storage device for block pieces. However, it can also be a separate device.

If additional transport carriers are used after the deblocking for the conveying and/or the transport of deblocked lenses, in particular for further processing, the installation preferably has an additional return-conveying device for return-conveying the transport carriers according to the additional type, in particular to the deblocking device. Thus, in particular, circulation or circular conveying of the additional transport carriers is also made possible.

According to a third, also independently realizable aspect of the present invention, in particular a first and/or second circuit for the transport carriers and/or a separate, additional and/or third circuit for the block pieces is or are formed according to the proposed solution by the installation and/or the method. In particular, two separate circuits for the transport carriers of the standard type, on the one hand, and the transport carriers of the additional type, on the other hand, can be formed. This is conducive to an automated and optimized process sequence.

According to a fourth, also independently realizable aspect of the present invention, the transport carriers and/or deblocked block pieces are conveyed directly to the blocking device. Further, a corresponding conveying of the lenses that are to be processed to the blocking device takes place then. After the blocking, the transport carriers are fitted by machine with the blocked lenses. This also allows for an automated and optimized process sequence.

According to a fifth, also independently realizable aspect of the present invention, a method according to the proposed solution is distinguished in particular in such a way that the lenses are conveyed in or on transport carriers from the blocking device to the processing devices and the deblocking device, wherein the transport carriers, after their use, in particular after the deblocking or directly by the deblocking device, are return-conveyed by means of a return-conveying device and are fitted either in the blocking device with blocked lenses that are to be processed and/or in the commissioning device with lenses that are unblocked and/or that are to be processed and optional block pieces. This allows for an automated and thus optimized process sequence.

According to a sixth, also independently realizable aspect of the present invention, the deblocked block pieces are return-conveyed by means of transport carriers and/or a return-conveying device from the deblocking device to the commissioning device or directly to the blocking device. Especially preferably, the block pieces are optionally intermediately stored and/or, if necessary, exchanged and/or intermediately stored in the commissioning device. This allows for an automated and thus optimized process sequence.

Preferably, the information or information carriers, with which the transport carriers and/or their information carriers are optionally provided, is/are again in an automated manner cleared or removed or updated and/or exchanged. This can be done, for example, in the deblocking device or in the last processing device, upon cleaning, upon in particular optical examination and/or upon new fitting, in particular in the commissioning device.

Especially preferably, the transport carriers, in particular of the standard type and/or additional type, are cleaned and/or optically examined. This is done in an automated manner, so that an optimized process sequence is made possible.

Preferably, the deblocked block pieces are cleaned by machine and/or optically examined. This is done in particular by machine, so that an automated and thus optimized process sequence is made possible.

Especially preferably, the deblocked, i.e., used, block pieces are sorted and/or examined with respect to their size and/or shape. This is done in particular by machine, so that an automated and thus optimized process sequence is made possible. Then, the block pieces are preferably reused.

According to a seventh, also independently realizable aspect of the present invention, it is also possible to "refurbish" the deblocked, i.e., used, block pieces again. This can be done by a shaping and/or mechanical processing, for example when the block material hardens and connects firmly, permanently and/or undetachably to the block piece.

The refurbished and/or examined block pieces are then reused, in particular fed again to the blocking device. In particular, the feeding is done again via the commissioning device, where the transport carriers are fitted with the block pieces together with the lenses that are to be processed and then are conveyed to the blocking device.

However, other conveying sequences are also possible. In particular, the block pieces and the lenses that are to be processed can, if necessary, also be conveyed separately to the blocking device.

According to an eighth, also independently realizable aspect of the present invention, it is also possible that the lenses are provided on their block side—in particular only directly—before the blocking and/or in the installation with a protective layer or protective film, and that the protective layer or protective film is removed again after the deblocking of the respective lens, in particular in the deblocking device and/or before a coating of the block side and/or before another processing, especially preferably edge processing, of the respective lens. This allows for an optimized and/or fully-automated process sequence.

The above-mentioned and subsequent aspects and features of this invention can be combined arbitrarily with one another, but also in each case can be realized independently of one another.

Additional aspects, features, advantages, and properties of the present invention follow from the following description of preferred embodiments with reference to the accompanying drawings.

DETAILED DESCRIPTION OF THE INVENTION

In the figures, the same reference numbers are used for the same or similar components and devices, wherein the same or corresponding advantages and properties follow, even when a repeated description is omitted.

Figure 1:
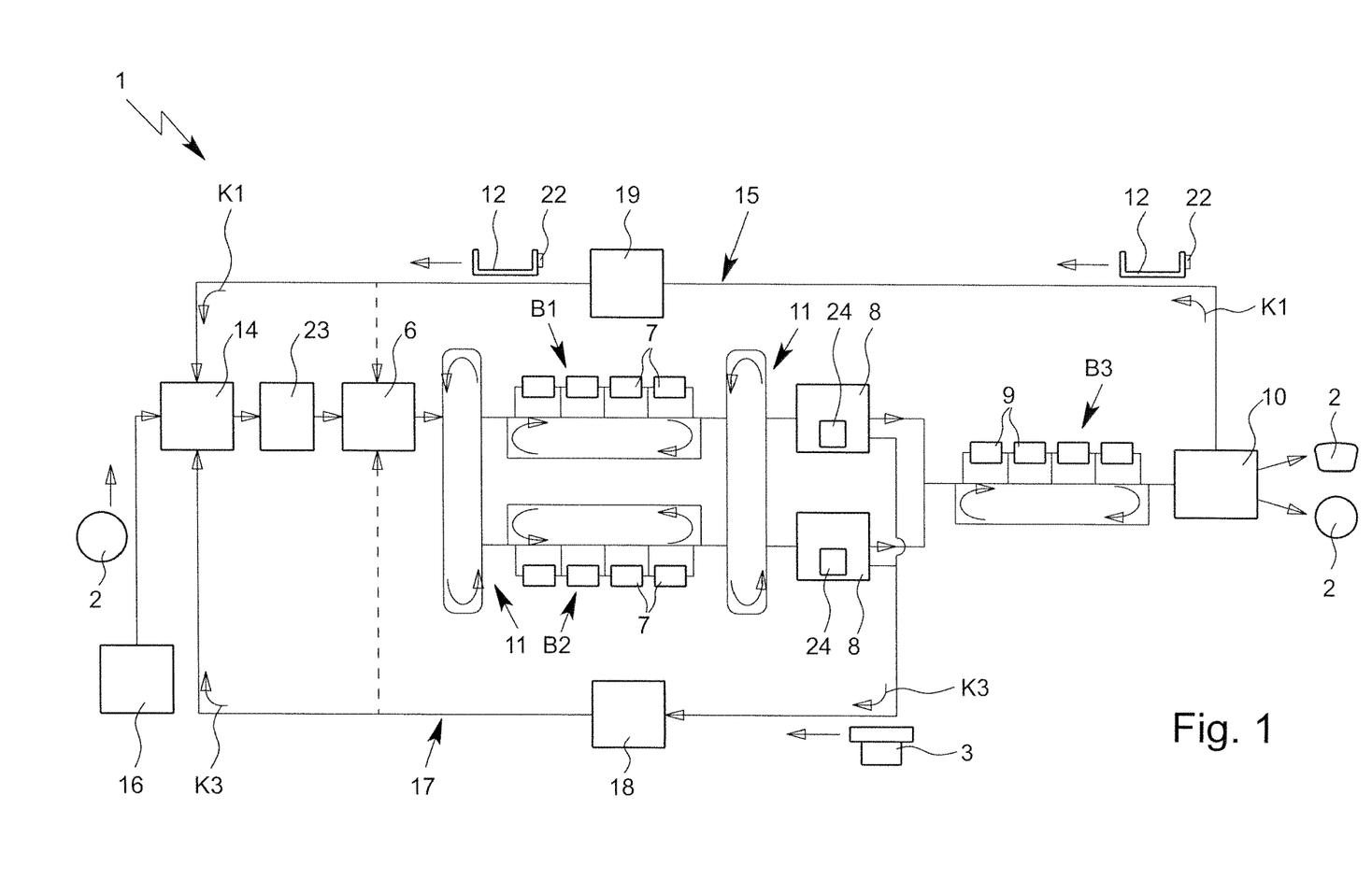
FIG. 1 shows a schematic depiction of an installation according to the invention with multiple processing devices according to a first embodiment.

In a diagrammatic depiction, FIG. 1 shows an installation 1, according to the proposed solution, for processing optical lenses 2, i.e., a lens-processing installation.

Especially preferably, the lens 2 is a so-called eyeglass lens, i.e., a lens for eyeglasses.

The lens 2 preferably is made of plastic, but optionally can also consist of glass or the like.

The lens 2 preferably has a diameter of several centimeters, in particular of more than 3 cm.

Figure 2:
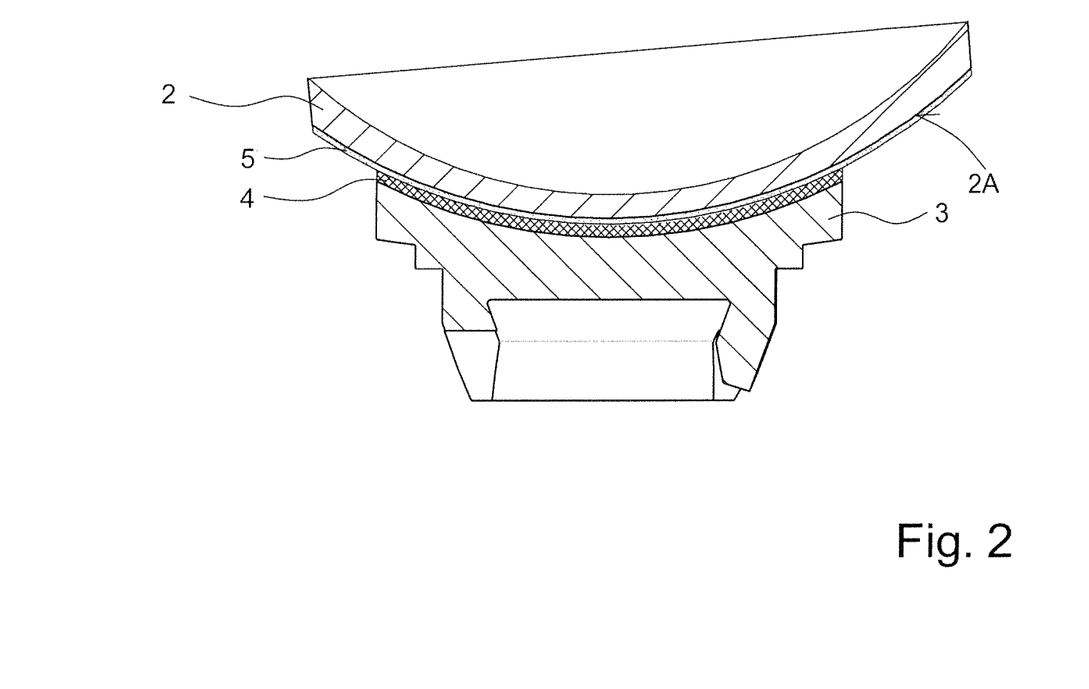
FIG. 2 shows a schematic section of a blocked lens 2.

In a diagrammatic section, FIG. 2 shows a lens 2, which is blocked, i.e., temporarily fastened, on an assigned block piece 3 by means of a block material 4.

The block piece 3 is designed in particular for a clamping with a defined rotational position for a processing of the assigned lens 2.

The block material 4 is especially preferably a thermoplastic, as described in particular in International Patent Publication WO 2011/018231 A1 and corresponding U.S. Pat. No. 9,340,669 B2. In principle, however, it can also be an alloy with a low melting point or another material, for example an adhesive, an adhesive strip or the like.

Optionally, a protective layer or protective film 5 is arranged or provided on the block side 2A or on the side of the lens 2 that faces the block material 4 or block piece 3, as indicated diagrammatically in FIG. 2. The protective film 5 is in particular glued to the lens 2 or block side 2A of the lens 2 and serves in particular to protect this already finished and/or formed flat side or block side 2A of the lens 2.

In principle, however, it is also possible to block the lens 2 without the protective layer or protective film 5 directly by means of the block material 4.

The installation 1 according to the proposed solution preferably has a blocking device 6 for blocking—i.e., temporarily fastening—a lens 2 that is to be processed on an assigned block piece 3 by means of the block material 4.

The installation 1 preferably has one or more processing devices 7, 9 for processing the in particular blocked lenses 2.

The processing devices 7, 9 are designed in particular as separate processing devices and/or for independent processing of the lenses 2.

The processing devices 7, 9 serve in particular for different processing steps. Further, preferably some or multiple processing devices 7, 9 are designed for the same processing work in order to achieve, with consideration of time for processing, a higher throughput and/or redundancy in the case of loss of a processing device 7, 9.

The processing devices 7, 9 make possible, for example, a shaping, in particular mechanical processing or machining or milling, of a flat side or optically effective side of the lenses 2, an edge processing of the lenses 2, a polishing of the lenses 2, a testing or measuring of the lenses 2, a marking of lenses 2, and/or a coating of lenses 2.

If necessary, multiple processing devices 7, 9 of the same kind, for example two or more processing devices 7, 9 for the same processing work, can also be present and/or integrated into the installation 1. For example, multiple processing devices 7 for shaping or multiple processing devices 7 for polishing can be pre-specified. This depends in particular on the throughput of the various processing devices 7 and/or the desired processing work.

A special advantage of the installation 1 according to the proposed solution consists in the fact that additional processing devices 7, 9 can very easily be integrated or incorporated, into the installation 1 also later, if necessary; expansions can thus very easily be carried out.

Especially preferably, multiple processing devices 7 form a processing line B.

The installation 1 according to the proposed solution preferably has one or more processing lines B. In particular, the installation 1 has at least one processing line B1 for processing blocked lenses 2, in particular for shaping processing of at least one flat side and/or for polishing, and preferably at least one additional processing device 9 and/or processing line B3 for further processing of unblocked lenses 2, in particular for cleaning, for coating, for edge processing, for testing and/or for packaging. In the illustrative example, the installation 1 has two processing lines B1 and B2 for processing blocked lenses 2 and a processing line B3 for further processing of unblocked lenses 2.

The installation 1 preferably has at least one deblocking device 8 for deblocking the lenses 2 that in particular have already been subjected to at least one processing, i.e., for separating or detaching the lenses 2 from the block piece 3 that is assigned in each case. In the illustrative example, the installation 1 preferably has multiple, here two, deblocking devices 8.

The deblocking is done in particular after the shaping processing of at least one flat side and/or optically active side of the lenses 2 and after the polishing and/or before a coating and/or before an edge processing of the lenses 2.

Especially preferably, the deblocking device 8 or the deblocking devices 8 is/are downstream from the processing line B1, B2 for processing blocked lenses 2 and/or upstream from the processing line B3 for processing deblocked lenses 2 or integrated into the processing line B1, B2 or into the processing line B3.

After the deblocking, a removal of the optional protective layer or protective film 5 from the lenses 2 preferably takes place. To this end, the installation 1 and/or deblocking device 8 preferably has a device 24, as indicated diagrammatically. The device 24 for removing the protective layer or protective film 5 is integrated in particular into the deblocking device(s) 8, but can also be designed as a separate device 24 and/or integrated into the subsequent and/or additional processing or processing line B3.

Further, a cleaning of the deblocked lenses 2 that is additional or that is sufficient and/or adapted for a subsequent coating of the lenses 2 can also take place in the deblocking device 8 and/or device 24.

After the deblocking, preferably the further processing and/or end processing of the deblocked lenses 2, in particular a cleaning, a coating, an edge processing—especially preferably for adapting to an eyeglasses frame or a spectacle frame—a testing or the like, takes place, here in particular by the additional processing devices 9 and/or additional processing line B3. Finally, a hand-off of the finished lenses takes place.

The installation 1 preferably has a hand-off device 10 for packaging, marking, intermediately storing and/or handing off the processed—preferably finished—lenses 2. It is diagrammatically indicated in FIG. 1 that the lenses 2—if necessary or depending on the processing which has taken place—are output or released as (finished) edge-processed (i.e., fitted to an eyeglasses frame) lenses 2 or as lenses 2 that are not yet edge-processed and/or not yet fitted to an eyeglasses frame.

The edge processing of the lenses 2 for fitting to an eyeglasses frame, a packaging and/or a quality assurance or examination of the lenses 2 can optionally take place selectively during additional processing, in or after the hand-off device 10 and/or installation 1, i.e., if necessary also later or separately.

The installation 1 preferably has at least one transport system 11 for transport of the lenses 2 and/or of transport carriers 12, 13 with the lenses 2 to and from the processing device 7 and/or processing lines B.

In the first embodiment according to FIG. 1, only one type of transport carrier 12 is depicted by way of example, which subsequently is referred to in particular also as "standard type" and/or which is designed in particular both for taking up at least one lens 2 and at least one block piece 3, especially preferably a pair of lenses 2 and two block pieces 3.

The transport system 11 conveys the lenses 2 or transport carriers 12, 13 in particular from the blocking device 6 to the processing devices 7 or to at least one processing line B1 or B2 and from there to at least one deblocking device 8 and in particular or optionally to additional processing devices 9 and/or the (additional) processing line B3 and/or to the hand-off device 10, as shown in FIG. 1 schematically or by the arrows that indicate the conveying.

The transport system 11 is in particular made up of multiple conveying devices, such as conveyor elements, manipulation devices, or the like.

The transport system 11 is made up in particular in such a way that a selective conveying of the lenses 2 or transport carriers 12, 13 to and from the individual processing lines B1 to B3, the individual processing devices 7, 9 of a processing line B1, B2, B3, and/or the deblocking devices 8 is made possible. Finally, the transport system 11 makes it possible to convey the lenses 2 and/or transport carriers 12, 13 to the at least one hand-off device 10.

Figure 3:
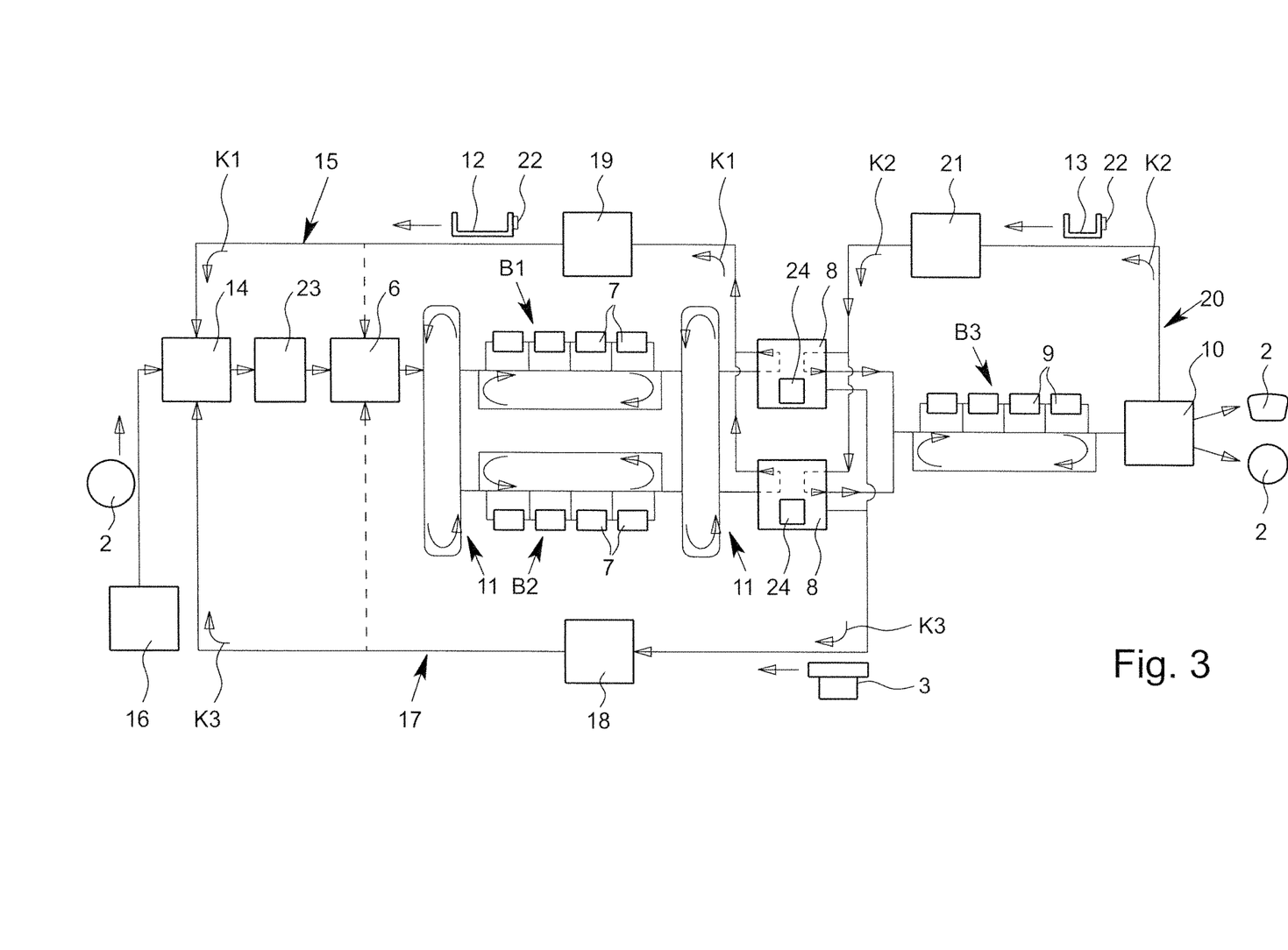
FIG. 3 is a schematic depiction of an installation according to a second embodiment of the invention.

Various transport carriers 12, 13 can also be used depending on the implementation. In a diagrammatic depiction that corresponds to FIG. 1, FIG. 3 shows a second embodiment of the installation 1 according to the proposed solution. Here, two different types of transport carriers 12, 13 are indicated. In particular, in addition to the transport carrier 12 of the standard type, another transport carrier 13 is also indicated, which is also referred to below as "additional type" and/or which is designed in particular smaller than the transport carrier 12 of the standard type and/or only for taking up one or two (unblocked) lenses 2.

The transport carriers 12, 13 are preferably designed box-like and/or upwardly open and/or for loosely taking up or holding the lenses 2 and/or block pieces 3.

Optionally, the transport carriers 12 and/or 13 are each provided with an information carrier 22 for providing information on the lenses 2 and/or block pieces 3 that are transported in each case with the transport carrier 11, 12. The information contains in particular all data that is essential for the processing and/or makes it possible to access the data that is necessary for the processing, for example via a system control, database, or other management of the installation 1 or an assigned lens management system or the like.

The installation 1 preferably has a commissioning device 14 for in particular fully-automated or partially-automated fitting of the transport carriers 12 with lenses 2 that are to be processed and block pieces 3. The commissioning device 14 is upstream from the blocking device 6.

In particular, the transport system 11 conveys transport carriers 12 that are fitted with lenses 2 and block pieces 3 from the commissioning device 14 to the blocking device 6.

Optionally, the installation 1 has a device 23 for applying the protective layer or protective film 5 on the lens 2 or the block side 2A thereof. This device 23 is preferably downstream from the commissioning device 14 and/or upstream from the blocking device 6.

The device 23 can be integrated into the commissioning device 14 and/or blocking device 6 or can be designed as a separate device, as indicated in FIG. 1. In the last-mentioned case, the transport system 11 preferably conveys the lenses 2, in particular by means of the transport carriers 12, first to the device 23 for applying the protective layer or protective film 5 and then from the latter onwards, in particular to the blocking device 6. Especially preferably, a conveying of the fitted transport carriers 12 from the commissioning device 14 to the device 23 and subsequently to the blocking device 6 thus takes place. However, in principle, it is also possible for the device 23 to be integrated differently into the installation 1, for example upstream of the commissioning device 14.

In the blocking device 6, the lens 2 and the related block piece 3 are preferably removed in an automated manner and blocked in a desired way. Then, the same or a different transport carrier 12 is fitted again with the blocked lens 2 by the blocking device 6.

In the illustrative example, the transport carrier 11 preferably carries a pair of lenses 2, in particular for forming two eyeglass lenses of a pair of eyeglasses, and two assigned block pieces 3. Accordingly, after the blocking by the blocking device 6, the transport carrier 11 is preferably fitted again with two blocked lenses 2 that are part of a pair of eyeglasses.

It is to be noted that the installation 1 can also have multiple blocking devices 6, which, for example, selectively or depending on utilization or design, are fed or supplied by the transport system 11 with the lenses 2 that are to be blocked and/or the transport carriers 12 provided therewith.

Especially preferably, the transport carriers 12, after their use, are return-conveyed again by means of a (first) return-conveying device 15 and are fitted by machine with lenses 2 that are to be processed (in particular, i.e., lens blanks) and optionally block pieces 3. In the illustrative example, this takes place especially preferably in or by means of the commissioning device 14.

Alternatively, however, it is also possible that the transport carriers 12 are return-conveyed to the blocking device 6 after use and/or by means of the return-conveying device 15, as indicated in dotted lines in FIG. 1. In this case, the commissioning device 14 can be omitted. The transport carriers 12 are then fitted with the already blocked lenses 2 in the or by the blocking device 6, preferably by machine.

Especially preferably, the fitting of the transport carriers 12 takes place, however, in an automated manner in the commissioning device 14.

The lenses 2 or lens blanks that are to be processed are preferably provided by a storage device 16 of the installation 1, in particular conveyed to the commissioning device 14. The storage device 16 can in particular be directly coupled to the commissioning device 14 or integrated into the latter.

In particular, an unpacking of the lenses 2 or lens blanks can be done in a partially-automated or fully-automated manner in the or by the storage device 16 or commissioning device 14.

The deblocked or used block pieces 3 are preferably return-conveyed by machine again from the deblocking device 8 or each deblocking device 8, here in particular to the commissioning device 14.

In the illustrative example, the return-conveying takes place preferably by means of a/(an) (additional) return-conveying device 17 for block pieces 3 that is indicated in FIG. 1.

Especially preferably, after the deblocking, i.e., after use, the block pieces 3 are cleaned, in particular optically examined, sorted and/or intermediately stored. This can take place in particular in the deblocking device 8 and/or by means of a separate device 18, which is diagrammatically indicated in FIG. 1, and/or in the commissioning device 14.

Especially preferably, the cleaning, in particular removal of block material 4, takes place in the (respective) deblocking device 8.

The preferably optical examination of the block pieces 3, in particular with regard to complete removal of the block material 4, damage, or the like, takes place especially preferably in the deblocking device 8 or device 18.

The sorting or examination of the block pieces 2, in particular according to size and/or shape, takes place especially preferably in the blocking device 6, the deblocking device 8, the device 18, and/or the commissioning device 14.

The optional intermediate storage of the block pieces 3 takes place especially preferably in the deblocking device 8, the device 18, and/or the commissioning device 14.

When the intermediate storage takes place in the deblocking device 8 or device 18, corresponding or necessary and/or appropriate block pieces 3 in particular in response to the corresponding request from the blocking device 6 or commissioning device 14 are conveyed as required to the commissioning device 14 and/or controlled by a lens management system, not shown, of the installation 1 or the like.

The commissioning device 14 then places the lenses 2 that are to be processed and the block pieces 3 in particular from the top or loosely in the transport carrier 12.

Alternatively, there is also the possibility of conveying the deblocked block pieces 3 directly to the blocking device 6, as indicated by dotted lines in FIG. 1.

In the first embodiment that is depicted in FIG. 1, the transport carriers 12 are preferably first handed off and/or released from the hand-off device 10 and return-conveyed from there.

The released transport carriers 12 are preferably cleaned, provided with other information and/or other information carriers 22, in particular examined optically and/or intermediately stored. This can take place in particular in a device 19 that is assigned to the return-conveying device 15 and/or that is separate.

In particular, the cleaning of the transport carriers 12 takes place in the hand-off device 10, the device 19, the commissioning device 14, the blocking device 6, and/or the deblocking device 8.

The preferably optical examination of the transport carriers 12, in particular with respect to a successfully performed cleaning or necessary cleaning, the exchange or removal of the information carriers 22, damage, soiling, or the like, preferably take place in the hand-off device 10, the device 19, the commissioning device 14, the blocking device 6, and/or the deblocking device 8.

An optional intermediate storage of the transport carriers 12 takes place in particular in the hand-off device 10, the device 19, and/or the commissioning device 14. Alternatively or in addition, the return-conveying device 15 can make possible a corresponding intermediate storage, for example, by a circular conveying of the transport carriers 12 and a discharge, if necessary, of the corresponding transport carriers 12 for further conveying to the commissioning device 14.

Especially preferably, in particular a circular conveying or a (first) circuit K1 of the transport carriers 12 is thus made possible or realized.

Alternatively, or in addition, the transport carriers 12 and/or blocked lenses 2 can also circulate in the first and/or second processing line(s) B1, B2 and/or in the hand-off device 11—especially preferably for intermediate storage—and/or be conveyed in the circuit.

Alternatively, or in addition, the deblocked lenses 2 and/or transport carriers 12 can also circulate in the additional or third processing line 3—in particular for intermediate storage—or be conveyed in the circuit.

Especially preferably, a circular conveying or a (third or additional) circuit K3 of the block pieces 3 is made possible or realized.

In particular, the block pieces 3 can also be conveyed by means of transport carriers, not shown, from the (respective) deblocking device 8 again for blocking or to the commissioning device 14 or blocking device 6, wherein then these transport carriers in turn circulate or are conveyed in a (separate) circuit.

Subsequently, the second embodiment of the installation 1, according to the proposed solution, is explained in more detail based on FIG. 3. Herein, only significant differences are discussed in further detail, so that the previous embodiments and explanations apply in particular in supplementation or correspondingly, even without explicit repetition.

In the second embodiment, after the deblocking for the further transport of the deblocked lenses 2, preferably the transport carriers 13 of the additional type are employed or used.

The transport carriers 12 of the standard type or transport carriers 12 that were used originally for the transport of lenses 2 are then preferably directly return-conveyed again from or after the deblocking device 8. The circuit K1 of the transport carriers 12 thus runs here in particular starting from the commissioning device 14 via the optional device 23 for applying the protective layer or protective film 5, the blocking device 6, the processing devices 7 and/or processing lines B1, B2, the deblocking device(s) 8, and the optional device 19 again back to the commissioning device 14.

The additional transport carriers 13 or transport carriers 13 of the additional type circulate preferably through the third processing line B3 or post-processing.

In principle, the transport carriers 12, 13 can also be provided with a cover or a lid or the like in order to protect the lenses 2 from soiling. This is advantageous in particular for the additional transport carriers 13 during transport or in the case of the conveying of lenses 2 that are already cleaned for a subsequent coating or the like. This protected conveying or this embodiment of the transport carriers 12, 13 for protecting the lenses 2 represents an in particular also independently realizable aspect of the present invention.

In particular, the installation 1 has a return-conveying device 20 for return-conveying the transport carriers 13 from the hand-off device 10 to the deblocking device 8 or the deblocking devices 8.

For the additional transport carriers 13 of the additional type, a (second) circuit K2 preferably thus is made possible or implemented, which runs starting from the hand-off device 10 via an optional device 21, the deblocking device(s) 8, and the additional processing devices 9 and/or additional processing line B3 again to the hand-off device 10.

The additional transport carriers 13 are preferably cleaned and/or in particular optically examined. This takes place especially preferably in the optional device 21, which is integrated in particular into the return-conveying device 20 or is assigned to the latter.

The cleaning of the lens carriers 13 after use can optionally take place in the hand-off device 10, the optional device 21, or the (respective) deblocking device 8.

The, in particular, optical examination of the additional transport carriers 13, in particular with respect to a successfully-performed or necessary cleaning, the exchange or removal of the information carriers 22, the presence of damage, soiling or the like, can selectively be carried out in the hand-off device 10, the optional device 21, or the (respective) deblocking device 8.

The additional transport carriers 13 are preferably also provided with information carriers 22 or can be fitted therewith, as already explained for the transport carriers 12 of the standard type, so that the respective statements and explanations also apply in particular accordingly for the additional transport carriers 13. The information from the information carriers 22 of the transport carriers 13 can then be exchanged, scheduled, updated or amended, for example in the respective deblocking device 8, in particular, thus, during fitting with lenses 2 that are to be processed.

In general, the information of the information carriers 22 is preferably read, used, amended, and/or adapted by the processing devices 7, 9. For example, current processing status and/or properties relating to the lenses 2 and/or block pieces 3 can be stored or provided.

Especially preferably, the information and/or information carriers 22 contain an order number, via which all essential information on the respective lenses 2 and/or block pieces 3 and/or all information that is essential for the processing, and/or a processing status or the like can be accessed by individual devices, in particular the processing devices 7, 9 that perform the processing. This information is managed, kept available and/or accessed by, for example, a lens management system, not depicted, a database or the like.

In particular, in the second embodiment, it is suggested as an alternative—also independently of the further conveying and/or processing of the lenses 2—to return-convey the deblocked block pieces 3 again by means of the transport carriers 12 from the respective deblocking device 8, here in particular to the commissioning device 14. In this case, the separate return-conveying of the block pieces 3 or the return-conveying device 17 can be omitted. In particular, an at least essentially identical or common circuit K1 for the transport carriers 12 and block pieces 3 is thus formed or made possible.

It is to be noted that the conveying is carried out especially preferably in a fully-automated manner in particular by the transport system 11 and/or the return-conveying devices 15, 17 and/or 20, but also can be carried out in a partially-automated manner.

In general, it is noted that the method according to the proposed solution and the installation 1 according to the proposed solution make possible in particular a circulation and/or selective conveying of the lenses 2 or lens carriers 12, 13 to the individual processing devices 7, 9 and/or various processing lines B, as described in particular in International Patent Application Publications WO 2013/131656 A2 and/or WO 2017/080639.

Individual aspects and features of the described installation 1 as well as the described sequences, methods, and various embodiments can also be carried out independently of one another, but also in any combination.

What is claimed is:

1. Installation for processing eyeglass lenses, comprising:
    a blocking device for blocking a lens that is to be processed on a block piece by means of a block material,
    multiple processing devices for processing the lenses,
    a deblocking device for deblocking the processed lenses, and
    a transport system for conveying the lenses in or on transport carriers, and
    a commissioning device for fitting the transport carriers with lenses that are to be processed and block pieces wherein the commissioning device has a device for applying a protective layer or protective film on the lenses.

2. Installation according to claim 1, further comprising a device for cleaning the transport carriers.

3. Installation according to claim 1, further comprising a device for optical examination of the transport carriers.

4. Installation according to claim 1, further comprising a device for optical examination of the block pieces.

5. Installation according to claim 1, further comprising a device for storing the block pieces.

6. Installation according to claim 1, further comprising a device for sorting the block pieces according to at least one of size or shape.

7. Installation according to claim 1, wherein the device for applying the protective layer or protective film is at least one of downstream from the commissioning device or upstream from the blocking device.

8. Installation according to claim 1, further comprising a device for removing the protective layer or protective film from the lenses.

9. Method for processing eyeglass lenses by processing devices, comprising:
    blocking each lens for the processing on a block piece in a blocking device by means of a blocking material and
    deblocking each lens in a deblocking device after processing, and
    at least one of the following steps:
    using transport carriers for conveying the lenses from the blocking device to the processing devices and to the deblocking device, the transport carriers being return-conveyed after the deblocking by means of a return-conveying device and fitting the transport carriers by machine at least one of, at the blocking device, with blocked lenses that are to be processed or, at a commissioning device, with lenses that are to be processed;
    return-conveying deblocked block pieces by means of at least one of transport carriers or a return-conveying device from the deblocking device to either the blocking device or an upstream commissioning device;
    at least one of conveying and return-conveying the transport carriers in a circuit and at least one of conveying and return-conveying the block pieces in separate circuit;
    providing the lenses with a protective layer or protective film on a block side thereof before being blocked, and removing the protective layer or protective film at least one of after the deblocking in the deblocking device, before coating of the block side or before another processing of the lenses.

10. Method according to claim 9, comprising the further step of cleaning the transport carriers.

11. Method according to claim 9, comprising the further step of optically examining the transport carriers.

12. Method according to claim 9, comprising the further step of sorting the block pieces according to at least one of size or shape.

13. Method according to claim 9, comprising the further step of optically examining the block pieces.

14. Method according to claim 9, comprising the further step of providing the transport carriers with information or information carriers regarding the processing of the respective lenses and at least one of reading, using, amending and adapting the information by the processing devices.

15. Installation for processing eyeglass lenses, comprising:
a blocking device for blocking a lens that is to be processed on a block piece by means of a block material,
multiple processing devices for processing the lenses,
a deblocking device for deblocking the processed lenses, and
a transport system for conveying the lenses in or on transport carriers, and
at least one of the following features:
a return-conveying device for return-conveying at least one of the deblocked block pieces or the transport carriers to the blocking device or commissioning device;
at least one of a first and second circuit for the transport carriers and an additional circuit for the block pieces.

16. Installation according to claim 15, further comprising a device for cleaning the transport carriers.

17. Installation according to claim 15, further comprising a device for optical examination of at least one of the transport carriers and the block pieces.

18. Installation according to claim 15, further comprising a device for storing the block pieces.

19. Installation according to claim 15, further comprising a device for sorting the block pieces according to at least one of size or shape.

20. Installation according to claim 15, wherein the installation or the blocking device has a device for applying a protective layer or protective film on the lenses.

* * * * *